2,980,525

METHOD FOR COMBATING UNDESIRABLE PLANT LIFE

Johannes T. Hackmann and Pieter Ten Haken, Kent, England, assignors to Shell Oil Company, a corporation of Delaware No Drawing. Filed July 7, 1958, Ser. No. 746,679
Claims priority, application Great Britain July 12, 1957
4 Claims. (Cl. 71—2.7)

The present invention relates to novel symmetrical and unsymmetrical diesters or ester amides of carbonic acid and to their employment in compositions for the control of plant growth. More specifically the present invention relates to herbicidally active esters of carbonic and carbamic acids such as, for example, 1,2,2,2-tetrachloroethyl-N-allyl carbamate and 1,2,2,2-tetrachloroethyl-N-diallyl carbamate, which have been found to show outstanding utility as herbicides.

The novel compositions of the invention comprise a surface-active agent or a carrier, or a surface-active agent and a carrier, and a compound having the general formula $$Y.CO.O.CHClX$$

wherein X represents an aliphatic hydrocarbon group of 1 to 4 carbon atoms or an aryl group such as a phenyl group, which groups may carry at least one substitutent halogen atom, and Y represents a group of formula O.CHClR wherein the symbol R has the aforesaid signification for X, or a group of the formula OZ wherein Z represents a hydrocarbon group of 1 to 8 carbon atoms which may be unsaturated, or Y represents a group of formula $NR_1R_2$ wherein $R_1$ and $R_2$ each signify a hydrogen atom or an aliphatic hydrocarbon group of 1 to 4 carbon atoms, which may be unsaturated, or a cycloaliphatic or aromatic hydrocarbon group, which groups may carry at least one substituent halogen atom, or $R_1$ and $R_2$ may be linked to complete with the nitrogen atom a heterocyclic nitrogen group.

In the above general formula, the halogen is preferably chlorine.

The compounds of the above formula are symmetrical or unsymmetrical diesters of carbonic acid, or ester amides, i.e., carbamic acid esters.

Compounds of the above general formula may be prepared from phosgene, or the equivalent amount of diphosgene or triphosgene, by the following reactions:

(1) By reaction with approximately one molecular proportion of an aldehyde O.CHR in presence of a tertiary nitrogenous base such as quinoline, pyridine, dimethylaniline or the tertiary nitrogenous bases obtained as by-products of the petroleum industry, to produce a first addition reaction product of formula $$Cl.CO.OCHRCl$$

wherein R has the aforesaid meaning, followed by reaction of this product with either (a) An approximately molecular proportion of an aldehyde O.CHR which may or may not be the same as the aldehyde used in the first stage, to produce a second addition reaction product of formula

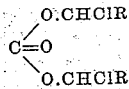

wherein the symbols R have the aforesaid meanings and may be the same or different, (b) An aliphatic alcohol of 1 to 8 carbon atoms, which is preferably unsaturated, e.g., allyl alcohol, diallyl alcohol or propargyl alcohol, or (c) Ammonia or a primary or secondary nitrogenous base, $NR_1R_2$, wherein $R_1$ and $R_2$ have the aforesaid meanings, to produce an ester amide or carbamic acid ester of general formula $$R_1R_2N.CO.OCHClR$$

which carbamic acid esters are novel compounds.

Preferred novel compounds are the 1,2,2,2-tetrachloroethyl carbamates of general formula $$R_1R_2N.CO.OCHCl.CCl_3$$

wherein $R_1$ and $R_2$ have the aforesaid meanings.

Examples of nitrogenous bases which may be used are the primary and secondary amines such as diethylamine, n-propylamine, allylamine, diallylamine, propynylamine, aniline, methylaniline, 1,3,5-trichloroaniline, 4-chloroaniline, furfurylamine and heterocyclic nitrogenous bases such as piperidine and morpholine.

(2) By reaction with approximately two molecular proportions of an aldehyde O.CHR, wherein R has the aforesaid meaning, or a mixture of two such aldehydes, in presence of a tertiary nitrogenous base such as pyridine, quinoline or dimethylaniline, to produce in one step a diester also obtainable by the method described in paragraph 1(a) above. The method is described in German Patent No. 121,223.

The aldehyde O.CHR used in the above reactions, wherein R has the aforesaid signification, may be an aliphatic compound which is saturated or unsaturated and is preferably substituted by at least one halogen, particularly chlorine, atom, for example, acetaldehyde, 1,2-dibromopropionaldehyde, 1,1-dichloropropionaldehyde, 1,1,2-trichlorobutyraldehyde, 2-chloro-acrolein, 1,1,1-trichloroacetone, 1,1,3-trichloroacetone and pentachloroacetone.

A particularly suitable aldehyde to use is chloral. By reacting phosgene with two molecular proportions of chloral, the compound di(1,2,2,2-tetrachloroethyl) carbonate is obtained. The herbicidal activity of compositions containing this compound is illustrated in Examples I to III.

Example I

Di(1,2,2,2-tetrachloroethyl) carbonate was applied as a 0.5% by weight dispersion in aqueous acetone containing 10% by weight of acetone and 0.25% by weight of Triton X-100 as dispersing agent, at the rate of 5 pounds per acre, to moist sand containing seeds of oats and mustard. The fresh weight of the emerged seedlings was determined three weeks later and compared with the fresh weight of seedlings in a control experiment where no chemical had been applied. A 63% reduction in the fresh weight of emerged oat seedlings but only an insignificant reduction in the weight of emerged mustard seedlings was obtained. This compound thus showed high pre-emergence activity with selective toxicity to monocotyledons and has potential use as a selective preemergence weed killer in sown dicotyledonous crops.

Example II

Di(1,2,2,2-tetrachloroethyl) carbonate was applied as a 0.5% by weight dispersion in aqueous acetone containing 10% by weight of acetone at the rate of 10.2 pounds of active material per acre to sand containing seeds of "wild oats" (Avena fatua). For comparative purposes, an aqueous solution of sodium trichloroacetate was applied at a rate of 10 pounnds per acre to a similar area of sand containing seeds of "wild oats." In both tests, germination of the "wild oat" seeds was inhibited to the extent of 70%.

Example III

In these tests, the herbicidal activity of di(1,2,2,2-tetrachloroethyl) carbonate against the perennial grass (*Agropyrum repens*) was compared with that of sodium trichloroacetate.

The compounds were dissolved in acetone and water, respectively. Each solution was then intimately mixed with sand and the mixture dried. The quantity of solution used was sufficient to give a concentration of 0.035% by weight of the compound in the dried sand mixture. The mixture of sand and compound was then mixed into the top one inch of soil in which were growing seedlings of *Agropyrum repens*, the compound being applied at the rate of 30 pounds per acre. After one week, a reduction of 49% in the fresh weight of seedlings treated with di-(1,2,2,2,-tetrachloroethyl) carbonate was obtained compared with untreated control seedlings. With sodium trichloroacetate, a 50% reduction in fresh weight compared with untreated seedlings was obtained.

When applied as a 0.5% by weight dispersion in aqueous acetone containing 10% by weight of acetone and 0.25% by weight of Triton X-100 to growing grass to run-off, a reduction in fresh weight of 49% was obtained. Sodium trichloroacetate is practically inactive when applied post-emergence.

Di(1,2,2,2,-tetrachloroethyl) carbonate is therefore a preferred compound for use in the compositions of the invention.

Aromatic aldehydes, preferably containing at least one halogen, particularly chlorine substituent, in the nucleus may also be used in the above reactions with phosgene. Examples of such aldehydes are benzaldehyde, 2-chlorobenzaldehyde, 4-chlorobenzaldehyde and 2,4-dichlorobenzaldehyde. These compounds have high post-emergence activity when applied in oil solution but are practically inactive when applied as an aqueous dispersion. They are also practically inactive when applied at 5 pounds per acre as a dispersion in aqueous acetone containing Triton X-100 to moist sand containing seeds of oats and mustard.

Example IV

Di[1-chloro-1-(2-chlorophenyl)methyl] carbonate was sprayed as a 0.1% by weight solution in a highly refined kerosene at 50 gallons per acre to plants of oats, mustard and linseed. After one week, a 51% reduction in the fresh weight of oats and 43% in the fresh weight of mustard, compared with untreated control plants, was recorded, the linseed being quite unaffected. The compound thus shows high selectivity to different types of dicotyledonous plants.

Very high pre-emergence herbicidal activity is also exhibited by carbamic acid esters of formula

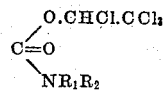

when at least one of the groups $R_1$ and $R_2$ represents a hydrocarbon group consisting of or containing a chain of 3 carbon atoms, which is preferably unsaturated, attached to the nitrogen atom. These compounds are obtained as indicated under paragraph 1 by reacting the ester acid chloride $CCl_3.CHCl.O.COCl$ with an aliphatic amine $NR_1R_2$. Examples of such amines are n-propylamine, di-n-propylamine, allylamine, diallylamine, and propynylamine. Preferred compounds of this type are 1,2,2,2-tetrachloroethyl N-allyl carbamate and 1,2,2,2-tetrachloroethyl N-diallyl carbamate.

Example V

In this example, tests are described to demonstrate the herbicidal activity of 1,2,2,2-tetrachloroethyl N-allyl carbamate.

This compound was applied at the rate of 5 pounds per acre, as a 0.5% dispersion in aqueous acetone containing 0.25% by weight of Triton X-100 as emulsifying agent, to moist sand containing seeds of oats and mustard. A 76% reduction in the fresh weight of emerged oat seedlings but only 16% reduction in the fresh weight of emerged mustard seedlings, as compared with untreated control seedlings was obtained. This selective pre-emergence herbicidal action is of the same order as that exhibited by sodium trichloroacetate.

The compounds of the general formula specified above may be formulated in the compositions of the invention with one or more finely divided solid carriers or with liquid carriers. They may be formulated with one or more surface-active agents or with both a carrier and a surface-active agent. These compositions may be suitable for application as such or may be concentrates which are diluted for application, for example, with relatively large volumes of finely divided solid carriers where a dust is required or with water where an aqueous spray is required. To enable hard water to be used for dilution, the surface-active agents employed in the compositions of the invention are preferably of the non-ionic type as, for example, the condensation products of ethylene oxide with oleyl alcohol, abietic acid and p-octylphenol.

The compositions of the invention may be applied by the dusting and spraying techniques commonly employed in the agricultural industry.

Compositions of the invention to be applied as dusts comprise an intimate mixture of the desired compound with a finely powdered solid carrier such as is commonly used in manufacturing pesticidal dusts for agricultural and horticultural use, for example, finely powdered talc, clay, silica, carbon, fuller's earth or kieselguhr. These powder carriers may be oil treated to improve adhesivity to the plant surface.

Compositions of the invention formulated as wettable powders are very useful. These comprise at least 10% by weight of the desired compound mixed with a finely divided solid carrier as indicated above and a dispersing and/or suspending agent.

The compounds of the specified general formula may also be formulated as wettable powders containing a major proportion of the active compound and a minor proportion of a wetting agent or a suspending agent or both a wetting and a suspending agent.

Other additives may be present, for example, water conditioning agents such as sodium phosphate, sodium polyphosphate or cellulose ethers such as methyl cellulose of the sodium salt of cellulose glycollic acid. These compositions are diluted with water for application.

Liquid compositions of the invention comprise a solution or dispersion of the compound of the above general formula in an organic liquid which may be applied either as such or after dilution. The organic liquid is preferably a hydrocarbon oil such as a kerosene, gas oil or lubricating oil fraction or an aromatic extract obtained by extracting such petroleum fractions with solvents selective for aromatics, e.g., liquid sulfuric dioxide or furfural. The oil solutions of the derivatives are suitable for application by low volume spraying, for example, at rates of 5 to 10 gallons per acre.

The compositions of the invention may also be formulated as an emulsifiable concentrate which is a concentrated solution or dispersion of the derivatives in an organic liquid, preferably a water-insoluble organic liquid containing an added wetting or emulsifying agent. These concentrates preferably contain a minor proportion of water, for example, 5 to 10% by volume, based on the total composition, to facilitate subsequent dilution with water. Suitable organic liquids are, for example, the lower aliphatic alcohols and ketones, and hydrocarbon oils such as are specified above. These concentrates may be diluted with relatively large volumes of water for application by high volume spraying. Advantageously, these compositions are formulated with an organic solvent of high volatility and an emulsifier producing on dilution with water, in amount from 4 to 10 times the volume of the concentrate.

The aqueous diluted compositions obtained on diluting a wettable powder or emulsifiable concentrate with water are included in the scope of the invention.

The specified compounds may be used in the compositions of the invention in conjunction with other pesticidal compounds. So-called "stickers" may be added to increase adhesion of the compositions applied to plants.

We claim as our invention:

1. The method of combating undesirable plant life comprising applying to said plant life an herbicidally effective quantity of a compound having the formula

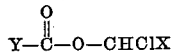

wherein Y represents a member selected from the group consisting of —OCHClX and —NR$_1$R$_2$ in which X represents a member of the group consisting of the unsubstituted alkyl radicals having from one to four carbon atoms and chlorine-substituted alkyl radicals having from one to four carbon atoms, and R$_1$ and R$_2$ each represent a member selected from the group consisting of hydrogen and aliphatic hydrocarbon radicals having up to four carbon atoms.

2. The method of combating undesirable plant life comprising applying to said plant life an herbicidally effective quantity of di(1,2,2,2-tetrachloroethyl) carbonate.

3. The method of combating undesirable plant life comprising applying to said plant life an herbicidally effective quantity of 1,2,2,2-tetrachloroethyl-N-allyl carbamate.

4. The method of combating undesirable plant life comprising applying to said plant life an herbicidally effective quantity of 1,2,2,2-tetrachloroethyl-N-diallyl carbamate.

References Cited in the file of this patent

UNITED STATES PATENTS

| | | |
|---|---|---|
| 2,535,875 | Stewart | Dec. 26, 1950 |
| 2,603,560 | Stewart | July 15, 1952 |
| 2,776,197 | Gysin et al. | Jan. 1, 1957 |
| 2,876,243 | Harman et al. | Mar. 3, 1959 |
| 2,904,422 | Leaper et al. | Sept. 15, 1959 |

FOREIGN PATENTS

| | | |
|---|---|---|
| 122,159 | Switzerland | July 6, 1948 |
| 205,460 | Australia | Mar. 8, 1956 |

OTHER REFERENCES

Beilstein: Band 3 (1918) page 8.
Beilstein: Band III–IV (Vienta Auflage), page 664.